F. G. WESTLAND.
SAFETY ATTACHMENT FOR CAN CAPPERS.
APPLICATION FILED OCT. 5, 1914.
1,193,647.
Patented Aug. 8, 1916.
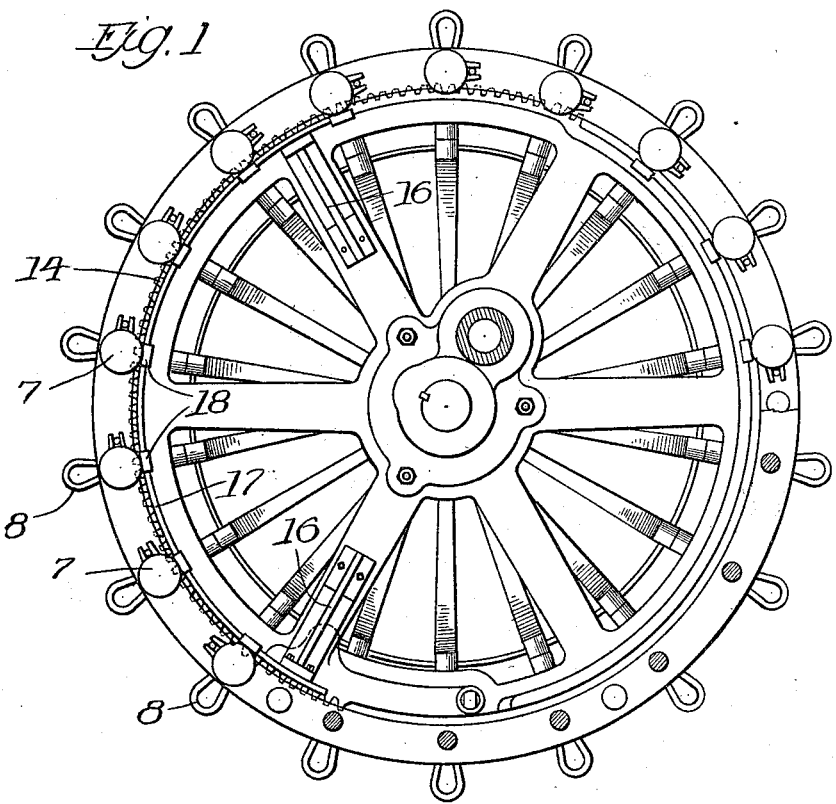
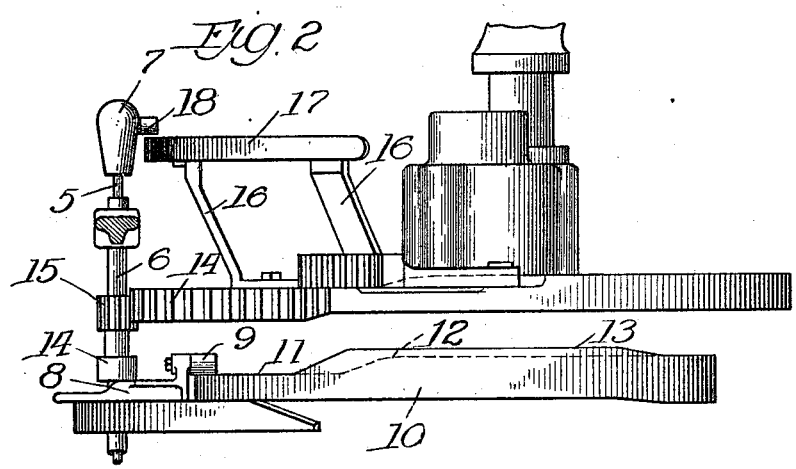

UNITED STATES PATENT OFFICE.

FRANK G. WESTLAND, OF HOOPESTON, ILLINOIS, ASSIGNOR TO SPRAGUE CANNING MACHINERY COMPANY, OF CHICAGO, ILLINOIS, A CORPORATION OF ILLINOIS.

SAFETY ATTACHMENT FOR CAN-CAPPERS.

1,193,647.

Specification of Letters Patent.  Patented Aug. 8, 1916.

Application filed October 5, 1914. Serial No. 865,094.

*To all whom it may concern:*

Be it known that I, FRANK G. WESTLAND, a citizen of the United States, residing at Hoopeston, in the county of Vermilion and State of Illinois, have invented new and useful Improvements in Safety Attachments for Can-Cappers, of which the following is a full, clear, concise, and exact description, reference being had to the accompanying drawing, forming a part of this specification.

My invention relates to safety attachments for can cappers.

In rotary can cappers as heretofore known it has been found that at times a can cap will be missing and as a result the vent rod will descend into the can and injure or ruin the contents.

It is one of the objects of my invention to provide means for preventing the vent rods from descending into an uncapped can.

It is a further object of my invention to provide a device for attaining such end, that is economical to manufacture, simple in operation and applicable to any standard rotary can capper.

Additional objects and advantages of my invention will be apparent from the following description taken in connection with the appended claims.

I have described in the following specification and illustrated in the accompanying drawings a safety attachment for can cappers constructed in accordance with my invention, it being clearly understood that changes may be made in the form, construction and arrangement of the parts without departing from the spirit of my invention or exceeding the scope of the appended claims, the form of the invention herein disclosed being merely one preferred embodiment thereof.

In the drawing: Figure 1 is a top view of a rotary can capper having my invention embodied therein; and Fig. 2 is a side elevation of a portion of Fig. 1.

Referring to the drawings, 5 denotes the upper ends of a plurality of vent rods of a rotary can capper of the sort in which filled cans with caps in place are fed onto a rotating table and are capped during their travel to the discharge point. The vent rods 5 slide in sleeves 6, from which are supported the capping steels, and are provided at their upper ends with weights 7 which cause them to drop by gravity unless otherwise prevented, as hereinafter appears. The ordinary vertical displacement of the steels and vent rods is regulated by lifting arms 8 associated with each sleeve and having rollers 9 which travel on a cam track 10 having a normal surface 11, and cam surfaces 12 and 13. Collars 14 on the sleeves 6 bear on the lifting arms 8 and the sleeves and vent rods are raised according to the position of the rollers on the cam track as will hereinafter be described.

Attached to the arms of a stationary segmental gear 14ª which meshes with pinions 15 on the sleeve 6 to cause the capping steels to rotate during the soldering process are arms 16 carrying a rail 17 which extends around that portion of the machine in which the soldering process is carried on, and in proximity to the weights 7. On the inner sides of the latter are studs 18 so arranged as to extend over the rail 17 and in the lowest normal position of the vent rods, to have a slight clearance above the rail. (Fig. 2.)

The operation of the machine is as follows: The cans are fed to the rotating table, one for each steel and vent rod, which travel a course corresponding to that of the cans. During that part of the travel in which the soldering takes place the steel sleeves and vent rods are in the position shown in Fig. 2. As the rotation continues the rollers 9 strike the cam surface 12 and raise the corresponding sleeves (carrying the steels) out of contact with the cans, the vent rods still holding the cap in place. Further rotation brings the rollers to the higher cam surface 13 and the sleeves 6 are further raised to an extent to cause them to raise the vent rods by contact with the weights 7. During this position of the parts the capped cans are discharged and the new cans fed onto the table. As the rollers 9 leave the cam surface 13 and reach normal surface 11 the capping steels and vent rods are permitted to drop by gravity to the position shown in Fig. 2 with the steels in soldering position and the vent rods in position to hold the caps in place. Should a can cap be missing it will be apparent that the corresponding vent rod will tend to drop farther. But under such conditions the stud 18 strikes the rail 17 and prevents any such movement of the rod. Consequently in case an uncovered can is fed into the machine, the vent rod is prevented from dropping into it with the resulting injury to the contents.

Having thus described my invention, what I claim as new and desire to secure by Letters Patent is:—

1. A can capping machine comprising a capping steel, a vent rod associated therewith, means for causing said steel and vent rod to travel in a definite path, and cam means for preventing the vent rod from dropping down into an uncapped can during that part of the travel of the steel in which soldering takes place.

2. A rotary can capping machine comprising a capping steel, a vent rod associated therewith, means for causing said steel and vent rod to travel in a circular path, and cam means for preventing the vent rod from dropping down into an uncapped can during that part of the travel of the steel in which soldering takes place.

3. A can capping machine comprising a steel and a vent rod, means for causing said steel and vent rod to travel in a definite path, means whereby the steel is given a vertical movement during its travel, and cam means whereby the vent rod is given a different vertical movement during its travel.

4. A can capping machine comprising a steel, a vent rod associated therewith, a follower secured to said vent rod, and a cam track engaged by said follower.

5. A can capping machine comprising a capping steel, a vent rod associated therewith, a weight secured to the upper end of said vent rod, and a follower secured to said weight.

6. A can capping machine comprising a capping steel, a vent rod associated therewith, means for causing relative movement between said steel and the can to bring them into and out of soldering position, and cam means for preventing the vent rod from dropping into the material in an uncapped can when the steel and can are in soldering position.

7. In a can capping machine, the combination with a vertically movable vent rod adapted to travel in a definite path, of means whereby said vent rod is in capping position during a portion of said travel, a rail substantially coextensive with the distance traveled by said vent rod while in said position, and a stud on said vent rod adapted to engage said track whenever said vent rod tends to descend below said position.

8. In a can capping machine, the combination with a vent rod of a weight on said vent rod tending to cause it to descend, a stud on said weight, a rail adapted to be engaged by said stud to prevent said vent rod from descending into an uncapped can.

In witness whereof, I have hereunto subscribed my name in the presence of two witnesses.

FRANK G. WESTLAND.

Witnesses:
ANTHONY J. KOLLOCK,
CHARLES H. BOYD.

Copies of this patent may be obtained for five cents each, by addressing the "Commissioner of Patents, Washington, D. C."